United States Patent
Paul et al.

(10) Patent No.: US 9,976,593 B2
(45) Date of Patent: May 22, 2018

(54) CONNECTING ROD AND INTERNAL COMBUSTION ENGINE

(71) Applicant: Dr. Ing. h.c. F. Porsche Aktiengesellschaft, Stuttgart (DE)

(72) Inventors: Michael Paul, Weissach (DE); Willi Schultz, Neulingen (DE)

(73) Assignee: DR. ING. H.C.F. PORSCHE AKTIENGESELLSCHAFT, Stuttgart (DE)

( * ) Notice: Subject to any disclaimer, the term of this patent is extended or adjusted under 35 U.S.C. 154(b) by 0 days. days.

(21) Appl. No.: 15/058,525

(22) Filed: Mar. 2, 2016

(65) Prior Publication Data

US 2016/0258479 A1 Sep. 8, 2016

(30) Foreign Application Priority Data

Mar. 5, 2015 (DE) .......................... 10 2015 103 207

(51) Int. Cl.
*F02B 75/32* (2006.01)
*F16C 7/06* (2006.01)
(Continued)

(52) U.S. Cl.
CPC .............. *F16C 7/06* (2013.01); *F02B 75/045* (2013.01); *F16C 11/069* (2013.01);
(Continued)

(58) Field of Classification Search
CPC F16C 7/06; F16C 9/04; F16C 11/0623; F02B 75/045; F02B 75/044; F02D 15/02
(Continued)

(56) References Cited

U.S. PATENT DOCUMENTS 7,127,981 B2 * 10/2006 Endoh .................. F16J 1/22
92/165 PR
9,567,901 B2 * 2/2017 Schulze ............... F02B 75/045
(Continued)

FOREIGN PATENT DOCUMENTS

DE 10 2010 016 037 9/2011
DE 10 2014 100 585 1/2015
(Continued)

OTHER PUBLICATIONS

German Office Action dated Jan. 15, 2017.
Japanese Office Action dated Jan. 4, 2017.
German Search Report dated Oct. 6, 2015.

*Primary Examiner* — Marguerite McMahon
*Assistant Examiner* — James Kim
(74) *Attorney, Agent, or Firm* — Gerald E. Hespos; Michael J. Porco; Matthew T. Hespos

(57) ABSTRACT

A connecting rod has a big end bearing eye for attachment to a crankshaft, a small end bearing eye for attachment to a piston of a cylinder, and an eccentric adjusting device for adjusting an effective connecting rod length. The eccentric adjusting device has eccentric rods (15, 16) with first ends that engage on an eccentric lever of the eccentric adjusting device and second ends that engage on pistons (20, 21) guided in hydraulic chambers of the connecting rod. The second ends of the eccentric rods (15, 16) are spherical heads that engage in a corresponding recess (40) in the respective piston (20, 21), and the respective piston (20, 21) further accommodates a retention element (41), one segment of which rests on the spherical-headed end of the respective eccentric rods (15, 16).

16 Claims, 3 Drawing Sheets

(51) Int. Cl.
   *F02B 75/04* (2006.01)
   *F16C 11/06* (2006.01)
   *F16C 23/10* (2006.01)

(52) U.S. Cl.
   CPC .......... *F16C 11/0623* (2013.01); *F16C 23/10* (2013.01); *F16C 2360/22* (2013.01)

(58) Field of Classification Search
   USPC ............................................ 123/197.3, 48 B
   See application file for complete search history.

(56) References Cited

U.S. PATENT DOCUMENTS

| | | | |
|---|---|---|---|
| 2010/0139479 A1* | 6/2010 | Pirault | F02B 75/044 92/181 P |
| 2014/0014070 A1* | 1/2014 | Lee | F02B 75/047 123/48 B |
| 2015/0204236 A1 | 7/2015 | Paul | |

FOREIGN PATENT DOCUMENTS

| | | |
|---|---|---|
| DE | 102013224270 B3 | 1/2015 |
| JP | 2005147172 A | 6/2005 |

* cited by examiner

CONNECTING ROD AND INTERNAL COMBUSTION ENGINE

CROSS REFERENCE TO RELATED APPLICATION

This application claims priority under 35 USC 119 to German Patent Appl. No. 10 2015 103 207.4 filed on Mar. 5, 2015, the entire disclosure of which is incorporated herein by reference.

BACKGROUND

1. Field of the Invention

The invention relates to a connecting rod for an internal combustion engine and to an internal combustion engine.

2. Description of the Related Art

DE 10 2010 016 037 A1 and FIG. 1 herein show a connecting rod of an internal combustion engine that has an adjustable compression ratio. The connecting rod 10 has a big end bearing eye 11 for attaching the connecting rod 10 to a crankshaft (not shown in FIG. 1) and a small end bearing eye 12 for attaching the connecting rod 10 to a cylinder piston (not shown in FIG. 1) of the internal combustion engine. The connecting rod 10 is used with an eccentric adjusting device 13 that has an eccentric (not shown in FIG. 1), an eccentric lever 14 and eccentric rods 15, 16. The eccentric lever 14 has a bore arranged eccentrically with respect to a center 17 of the small end bearing eye 12 and has a center 18. The bore in the eccentric lever 14 accommodates the eccentric and a bore in the eccentric accommodates a piston pin. The eccentric adjusting device 13 is used to adjust an effective connecting rod length left, which is the distance of the center 18 of the bore in the eccentric lever 14 from a center 19 of the big end bearing eye 11. The eccentric rods 15, 16 can be moved to turn the eccentric body 14 and hence to change the effective connecting rod length left. Each eccentric rod 15, 16 is assigned a piston 20, 21 that is guided movably in a hydraulic chamber 22, 23. A hydraulic pressure prevails in the hydraulic chambers 22, 23 and acts on the pistons 20, 21 assigned to the eccentric rods 15, 16. Thus, movement of the eccentric rods 15, 16 is possible or not possible, depending on the oil quantity in the hydraulic chambers.

The adjustment of the eccentric adjusting device 13 is initiated by the action of inertia forces and load forces of the internal combustion engine that act on the eccentric adjusting device 13 during an operating cycle of the internal combustion engine. The directions of the forces acting on the eccentric adjusting device 13 change continuously during an operating cycle. The adjusting movement is assisted by the pistons 20, 21 acted upon by hydraulic oil, and the pistons 20, 21 act on the eccentric rods 15, 16 to prevent return of the eccentric adjusting device 13 due to varying directions of force of the forces acting on the eccentric adjusting device 13. The eccentric rods 15, 16 are attached to the eccentric body 14 on both sides. The hydraulic chambers 22 and 23 in which the pistons 20, 21 are guided can be supplied with hydraulic oil from the big end bearing eye 11 via hydraulic oil lines 24 and 25. Check valves 26 and 27 prevent the hydraulic oil from flowing back out of the hydraulic chambers 23 and 24 into the hydraulic lines 24 and 25. A changeover valve 29 is accommodated in a bore 28 in the connecting rod 10, and the switching position of the changeover valve 29 determines which of the hydraulic chambers 22 and 23 is filled with hydraulic oil and which of the hydraulic chambers 22 and 23 is emptied, thereby determining the adjusting direction or turning direction of the eccentric adjusting device 13. The hydraulic chambers 22 and 23 are in contact with the bore 28 that accommodates the changeover valve 29 via fluid lines 30 and 31, respectively. An actuating means 32, a spring device 33 and a control piston 34 of the changeover valve 29 are shown schematically in FIG. 1, and the operation of these components of the changeover valve 29 is known from DE 10 2010 016 037 A1.

As explained above, the hydraulic oil is fed from the big end bearing eye 11 to the hydraulic chambers 22, 23 via hydraulic lines 24 and 25. The connecting rod 10 engages on the crankshaft (not shown in FIG. 1) via the big end bearing eye 11 so that a connecting rod bearing shell 35 is arranged between a crankshaft bearing journal of the crankshaft and the big end bearing eye.

As explained above, a first end 36, 37 of each respective eccentric rod 15, 16 engages on the eccentric lever 14, while a second end 38, 39 of each respective eccentric rod 15 or 16 engages on a piston 20 or 21 that is guided respectively in the hydraulic chambers 22, 23 of the connecting rod 10, as shown in FIG. 1. Connecting pins are used to ensure hinge-type articulated attachment of the ends 36-39 of the eccentric rods 15, 16 to the eccentric lever 14 and the pistons 20, 21. However, the connecting pins require a high outlay on components and on manufacture. An improved attachment of the second ends 38, 39 of the eccentric rods 15, 16 to the pistons 20, 21 that are guided in the hydraulic chambers 22, 23 would be well received commercially.

It is the object of the invention to provide a novel internal combustion engine and a novel connecting rod.

SUMMARY

According to the invention, the second ends of the eccentric rods are designed as spherical heads that engage in a corresponding recess in the respective piston. The piston further accommodates a retention element, such as a retention ring, one segment of which rests on the spherical-head of the respective eccentric rods. Thus, a spherical-seat connection is provided between the eccentric rods and the pistons of the eccentric adjusting device of the connecting rod that are guided in the hydraulic chambers. The spherical-seat connection advantageously provides a degree of freedom in all directions for the articulated attachment of the respective eccentric rod to the respective piston. As a result, any skewing in the attachment of the eccentric rods to the pistons caused by manufacturing and assembly tolerances can be balanced out or compensated. A small axial play and high capacity for transmitting compression and tensile forces can be ensured by the retention element of the spherical-seat connection.

A bottom of the respective piston may have a recess corresponding to the spherical head and a recess for the respective retention element may be provided above and adjoining the recess for the spherical head. The spherical-headed end at the bottom of the eccentric rod rests directly on the respective piston and, immediately thereabove, rests directly on the respective retention element. Accordingly, the spherical head of each eccentric rod rests directly on the respective piston and directly on the retention element. A particularly simple construction is ensured for the spherical-seat connection between the pistons and the eccentric rods of the eccentric adjusting device.

Each piston and the respective retention element may be composed of a bearing material. Thus, a spherical-seat connection is provided between the eccentric rods and the pistons with a simple construction and lower susceptibility to wear.

The retention element may be a retention ring slotted at one location on the circumference. The slotted retention ring is advantageous facilitates assembly.

Each retention element may be snapped into the respective piston so that a segment of the retention element engages around or into an undercut formed on the respective piston. This embodiment allows particularly simple assembly and may dispense with a welded joint or an adhesive joint between the retention element and the piston.

Illustrative embodiments of the invention are explained in greater detail by means of the drawing without being restricted thereto.

DETAILED DESCRIPTION

Figure 1:
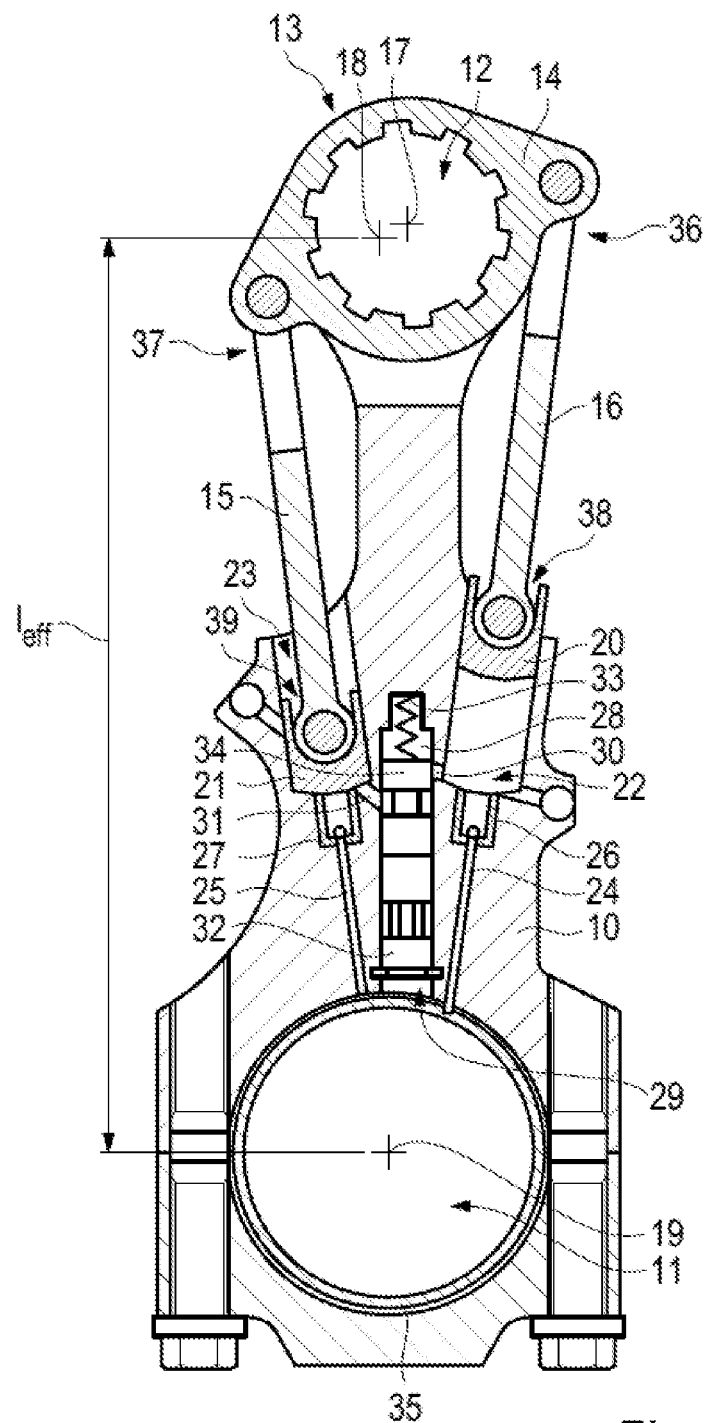
FIG. 1 shows a connecting rod of a prior-art internal combustion engine having an adjustable compression ratio.

An internal combustion engine having an adjustable compression ratio has at least one cylinder, and preferably a plurality of cylinders. Each cylinder has a piston that is coupled to a crankshaft of the internal combustion engine by a connecting rod 10. Each connecting rod 10 has a small end bearing eye 12 at one end and a big end bearing eye 11 at an opposite end. The big end bearing eye 11 engages on a crankshaft bearing journal of a crankshaft so that a connecting rod bearing shell is positioned between the crankshaft bearing journal and the big end bearing eye. A lubricating oil film can build up between the connecting rod bearing shell and the crankshaft bearing journal.

An internal combustion engine having an adjustable compression ratio has an eccentric adjusting device 13 in the region of each connecting rod 10 for adjusting the effective connecting rod length of the respective connecting rod 10.

The eccentric adjusting device 13 has an eccentric, an eccentric lever 14 and eccentric rods 15, 16 that can be moved in accordance with a hydraulic pressure prevailing in hydraulic chambers that interact with the eccentric rods to adjust the compression ratio. The hydraulic chambers interacting with the eccentric rods 15, 16 can be supplied with hydraulic oil starting from the big end bearing eye 11 of the respective connecting rod.

Adjustment of the eccentric adjusting device 13 is initiated by the action of inertia forces and load forces of the internal combustion engine.

The first ends 36, 37 of the eccentric rods 15, 16 engage on both sides of the eccentric lever 14, while the second ends 38, 39, the eccentric rods 15, 16 are secured on pistons 20, 21 that are guided in hydraulic chambers 22, 23 of the connecting rod 10.

Figure 2A:
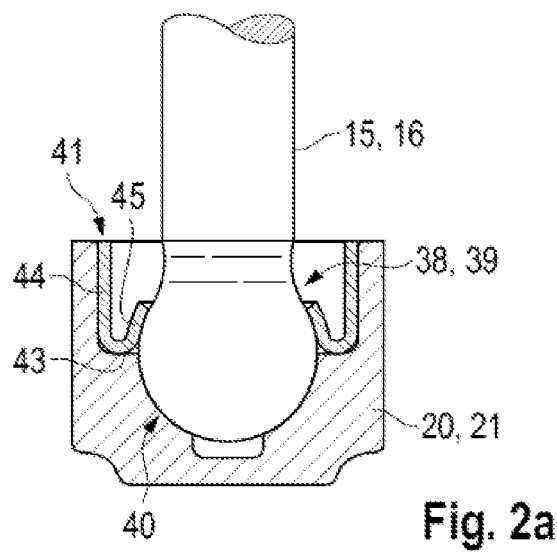
FIGS. 2a to 2c show a detail of a first connecting rod according to the invention.
Figure 2B:
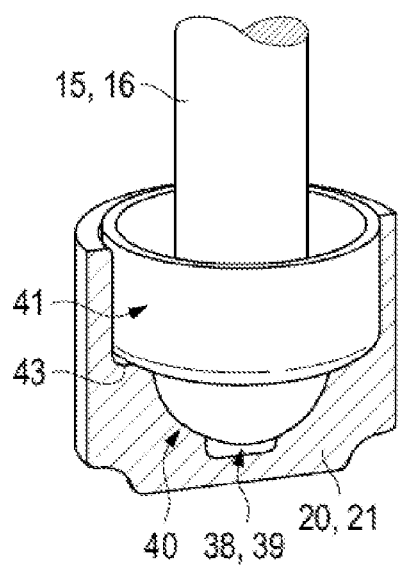
Figure 2C:
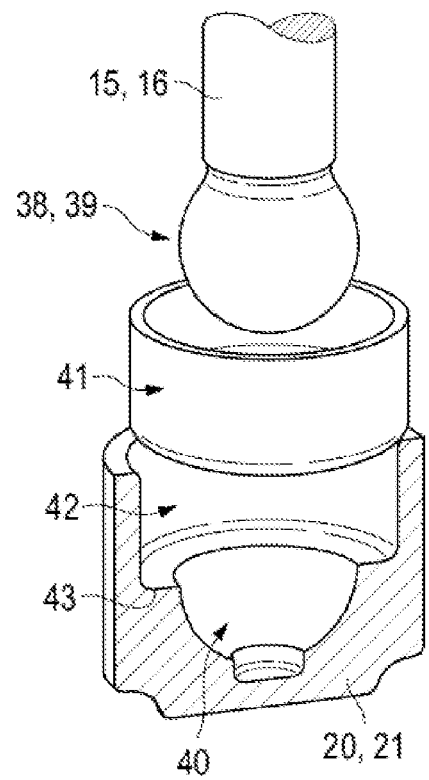

FIGS. 2a to 2c show a first embodiment of a connecting rod according to the invention in the region of a second end 38, 39 of an eccentric rod 15, 16 where the rod is attached to an adjustment piston 20, 21 of the eccentric adjusting device 13.

The second end 38, 39 of each eccentric rod 15, 16 defines a spherical head that engages in a corresponding recess 40 in the respective adjustment piston 20, 21 that is guided in the hydraulic chambers 22, 23.

Each adjustment piston 20, 21 further accommodates a retention element that preferably is a retention ring 41 that rests on a segment of the spherical-headed end 38 or 39 of the respective eccentric rod 15 or 16.

One segment of the spherical-headed end 38, 39 of the respective eccentric rod 15, 16 rests directly on the respective piston 20, 21, while another segment thereof rests directly on the respective retention ring 41. The spherical-seat connection provided in this way between the second ends 38, 39 of the eccentric rods 15, 16 and the respective piston 20, 21 accordingly consists in each case of just three subassemblies, namely the spherical heads at the second ends 38, 39 of the eccentric rods 15, 16, the piston 20, 21 and the retention elements 41 accommodated by the pistons 20, 21.

As shown in FIGS. 2a to 2c, the spherical head at the end of the respective eccentric rod 15, 16 rests directly in the recess 40 of the respective piston 20, 21.

Each piston 20, 21 has an adjoining recess 42 directly above the recess 40. The adjoining recess 42 accommodates the retention element or retention ring 41.

Thus, the spherical-headed second end 38, 39 of the respective eccentric rod 15, 16 rests in a simple manner directly on a guide surface provided by the recess 40 in the respective piston 20, 21, and a part immediately thereabove is engaged directly on a segment of the respective retention element or ring 41.

Thus, no further component is positioned between the spherical-headed second end 38, 39 of the respective eccentric rod 15, 16 and between the piston 20, 21 and the retention ring 41.

FIGS. 2a to 2c further show a shoulder 43 formed between the recess 40 in the respective piston 20, 21 that accommodates and guides a segment of the spherical head on the respective eccentric rod 15, 16, and the recess 42 that accommodates the respective retention element 41. The shoulder 43 delimits the insertion depth of the retention element or ring 41 into the respective piston 20, 21.

The retention ring 41 shown in FIGS. 2a to 2c is a cup-shaped component with an outer encircling wall 44 radially on the outside and an inner encircling wall 45 radially on the inside. The inner encircling wall 45 guides a segment of the spherical head of the respective eccentric rod 15, 16 and forms a bearing surface.

Some segments of the pistons 20, 21 and the retention ring 41 preferably are composed of a bearing material, namely at least in those segments that come into direct contact with the spherical head 38, 39 of the respective eccentric rod 15, 16. The pistons 20, 21 and the respective retention ring 41 can also be composed completely of a bearing material of this kind.

The retention ring 41 of the embodiment shown in FIGS. 2a to 2c initially is mounted on the respective spherical-headed second end 38, 39 of the respective eccentric rod 15, 16, and this preassembled unit then is inserted into the respective piston 20, 21. During this process, the retention ring 41 is connected firmly to the respective piston 20, 21, in particular by welding, adhesive bonding or press fitting.

Figure 3A:
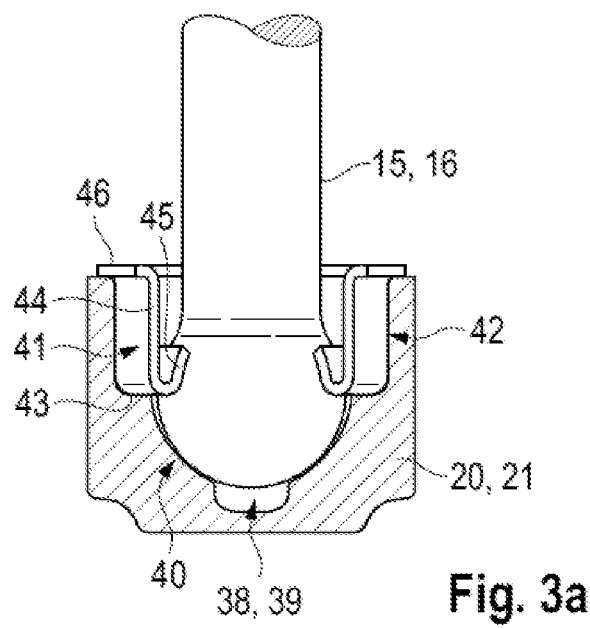
FIGS. 3a to 3c show a detail of a second connecting rod according to the invention.
Figure 3B:
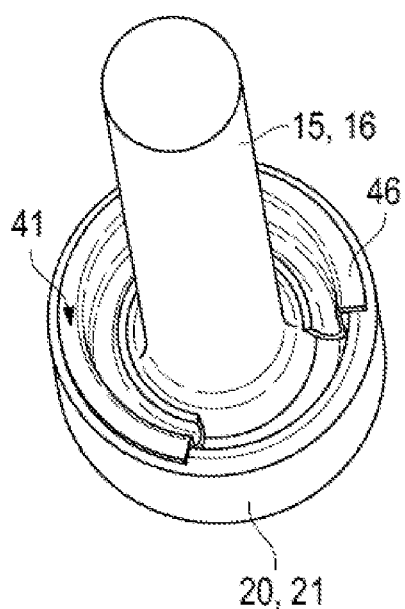
Figure 3C:
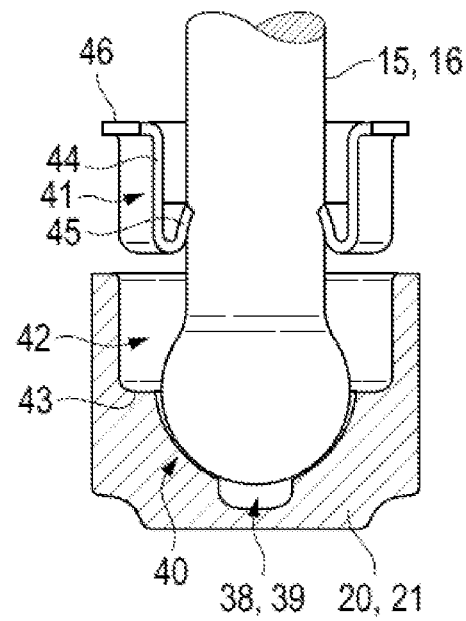

The embodiment of FIGS. 3a to 3c differs from the embodiment of FIGS. 2a to 2c in that the retention ring 41 is not of encircling design, but is interrupted or slotted at one location on the circumference. In the embodiment shown in FIGS. 3a to 3c, the retention ring 41 has a circumferential extent of approximately 270°.

The embodiment of FIGS. 3a to 3c also differs from embodiment in FIGS. 2a to 2c in that an encircling collar 46 is formed at the top on the wall 44 of the retention ring. The collar 46 is a positioning aid for the retention ring 41. Precise alignment of the retention ring 41 in the respective piston 20, 21 is accomplished by the encircling collar 46 in conjunction with the shoulder 43 between the recesses 40, 42 of the piston 20, 21.

The retention ring 41 can be snapped into the respective piston 21 so that the retention ring 41 engages around or in an undercut (not shown) formed on the respective piston 21. A snap joint of this kind, avoids a welded joint or adhesively bonded joint between the retention ring 41 and the respective piston 20, 21.

The slotted embodiment of the retention ring 41 or the embodiment of the retention ring with an interruption at a location on the circumference, as shown in FIGS. 3a to 3c, facilitates mounting the retention ring 41 on the spherical-headed end 38, 39 of the respective eccentric rod 15, 16.

Thus, the invention provides a spherical-seat connection between the eccentric rods 15, 16 of the eccentric adjusting device 13 and the piston 20, 21 of the eccentric adjusting device 13 that is guided in the hydraulic chambers 22, 23. A spherical-seat connection of this kind provides a rotational degree of freedom in all directions and allows manufacturing tolerances and assembly tolerances of the components to be compensated to ensure optimum attachment of the eccentric rods 15, 16 to the pistons 20, 21 guided in the hydraulic chambers 22, 23. The retention elements 41 permit a slight axial play and the capacity to transmit high compression and tensile forces. Each spherical-seat connection has just three subassemblies, namely the spherical heads of the eccentric rods 15, 16, the pistons 20, 21 and the retention elements 41.

At least some segments of the retention elements 41 and the pistons 20, 21 may be manufactured from a bearing material. To simplify assembly, the retention elements 41 are interrupted or slotted at one location on the circumference.

At the upper end, the respective retention element can have a collar 46 that can be present before assembly or can be provided by flanging during assembly.

What is claimed is:

1. A connecting rod, comprising: a big end bearing eye for attachment to a crankshaft, a small end bearing eye for attachment to a piston of a cylinder, and an eccentric adjusting device for adjusting an effective connecting rod length, the eccentric adjusting device having eccentric rods with first ends that engage on an eccentric lever of the eccentric adjusting device and second ends that engage on adjustment pistons guided in hydraulic chambers of the connecting rod, the second end of each of the eccentric rods defining a spherical head that engages in a corresponding spherical head recess in the respective adjustment piston, a shoulder extending out from the spherical head recess and a retention recess extending from the shoulder toward an end of the adjustment piston facing toward the small end bearing eye, and a retention element in the retention recess and having an inner encircling wall that rests on the spherical-head of the respective eccentric rods and an outer encircling wall spaced out from the inner encircling wall and being in direct contact with the adjustment piston along the retention recess.

2. The connecting rod of claim 1, wherein one segment of the spherical-head of the respective eccentric rod rests directly on the respective piston and another segment thereof rests directly on the inner encircling wall of the respective retention element.

3. The connecting rod of claim 1, wherein the pistons and the retention elements are each composed of a bearing material.

4. The connecting rod of claim 1, wherein the respective retention element is configured to be snapped into the respective adjustment piston so that a segment of the respective retention element engages around or into retention recess formed on the respective adjustment piston.

5. The connecting rod of claim 4, wherein the respective retention element is a retention ring with a slot at one circumferential location thereon.

6. An internal combustion engine with an adjustable compression ratio, comprising:
   at least one cylinder;
   a crankshaft;
   at least one connecting rod having a big end bearing eye attached to the crankshaft, a small end bearing eye attached to a piston of the cylinder; and
   an eccentric adjusting device for adjusting an effective connecting rod length, the eccentric adjusting device having an eccentric that interacts with an eccentric lever, and eccentric rods, each of the eccentric rods having a first end that engages on the eccentric lever and a second end opposite the first end and engaging on adjustment pistons guided in hydraulic chambers of the connecting rod, the second end of each of the eccentric rods defining a spherical head that engages in a corresponding spherical head recess in the respective adjustment piston, a shoulder extending out from the spherical head recess and a retention recess extending from the shoulder toward an end of the adjustment piston facing toward the small end bearing eye, and a retention element in the corresponding retention recess in the respective adjustment piston, the retention element having an inner encircling wall that rests on the spherical-head at the second end of the respective eccentric rods and holding the spherical head in the respective recess and having an outer encircling wall spaced out from the inner encircling wall and being in direct contact with the adjustment piston along the retention recess.

7. The internal combustion engine of claim 6, wherein the outer encircling wall extends substantially from the shoulder of the adjustment piston to the end of the adjustment piston facing the small end bearing eye.

8. The internal combustion engine of claim 7 wherein the outer encircling wall includes an outwardly extending flange engaged with the end of the adjustment piston facing toward the small end bearing eye.

9. The internal combustion engine of claim 6, wherein the retention element has a connection between the inner encircling wall and the outer encircling wall, the connection being engaged on the shoulder between the spherical head recess and the retention recess.

10. The internal combustion engine of claim 6, wherein the outer encircling wall is press fit into the retention recess.

11. The internal combustion engine of claim 6, wherein the retention element is secured to the adjustment piston by welding or adhesive bonding.

12. The connecting rod of claim 1, wherein the outer encircling wall extends substantially from the shoulder of the adjustment piston to the end of the adjustment piston facing the small end bearing eye.

13. The connecting rod of claim 12 wherein the outer encircling wall includes an outwardly extending flange engaged with the end of the adjustment piston facing toward the small end bearing eye.

14. The connecting rod of claim 1, wherein the retention element has a connection between the inner encircling wall and the outer encircling wall, the connection being engaged on the shoulder between the spherical head recess and the retention recess.

15. The connecting rod of claim 1, wherein the outer encircling wall is press fit into the retention recess.

16. The connecting rod of claim 1, wherein the retention element is secured to the adjustment piston by welding or adhesive bonding.

* * * * *